US008967288B2

(12) United States Patent
Yamada et al.

(10) Patent No.: US 8,967,288 B2
(45) Date of Patent: Mar. 3, 2015

(54) ANTI-VIBRATION STRUCTURE FOR OPERATION LEVER OF PORTABLE BRUSH CUTTER

(75) Inventors: Tetsuya Yamada, Tokyo (JP); Shigemitsu Chigira, Tokyo (JP)

(73) Assignee: Starting Industrial Co., Ltd., Tokyo (JP)

( * ) Notice: Subject to any disclaimer, the term of this patent is extended or adjusted under 35 U.S.C. 154(b) by 469 days.

(21) Appl. No.: 13/221,016

(22) Filed: Aug. 30, 2011

(65) Prior Publication Data
US 2012/0048582 A1 Mar. 1, 2012

(30) Foreign Application Priority Data

Aug. 30, 2010 (JP) ................ P. 2010-192914

(51) Int. Cl.
*A01D 34/68* (2006.01)
*A01D 34/90* (2006.01)

(52) U.S. Cl.
CPC ................ *A01D 34/905* (2013.01)
USPC ................ 173/162.2; 30/276

(58) Field of Classification Search
CPC ................ B25F 5/006; A01D 34/905
USPC .......... 173/162.1, 162.2; 30/276, 235, 517, 30/518, 520, 522–524; 16/406, 409–411, 16/413, 416, 422, 425, 426, 436–438, 443, 16/444; 24/460–462; 403/326, 329; 411/174, 175
See application file for complete search history.

(56) References Cited

U.S. PATENT DOCUMENTS

| | | | |
|---|---|---|---|
| 3,581,832 A * | 6/1971 | Heermann et al. | 173/162.2 |
| 4,236,310 A * | 12/1980 | Muller | 30/276 |
| 4,662,158 A * | 5/1987 | Zerrer | 56/12.7 |
| 4,819,742 A * | 4/1989 | Driggers | 173/162.2 |
| 4,825,548 A * | 5/1989 | Driggers | 30/276 |
| 4,936,394 A * | 6/1990 | Ohtsu | 173/162.2 |
| 5,345,684 A * | 9/1994 | Shoup et al. | 30/276 |
| 5,375,666 A * | 12/1994 | Pettet et al. | 173/162.1 |
| 5,692,306 A * | 12/1997 | Stoll et al. | 30/276 |

(Continued)

FOREIGN PATENT DOCUMENTS

| | | |
|---|---|---|
| EP | 1 530 890 A1 | 5/2005 |
| EP | 2 050 328 A1 | 4/2009 |

(Continued)

OTHER PUBLICATIONS

Extended European Search Report in EP 11 17 9212 dated Dec. 29, 2011.

(Continued)

*Primary Examiner* — Andrew M Tecco
(74) *Attorney, Agent, or Firm* — Nixon & Vanderhye P.C.

(57) ABSTRACT

According to one embodiment, there is provided an anti-vibration structure for an operation lever of a portable brush cutter, in which a lever device includes: a main body through which a pole is inserted in an axial direction, the main body including protrusions protruding from both ends in the axial direction; support members provided on the pole to support the both ends of the main body such that the main body is separated from the pole, each support member including a recess; and anti-vibration materials accommodated in the recesses of the support members so as to be sandwiched between the support members and the main body in the axial direction, respectively, each anti-vibration material including a groove to which a respective one of the protrusions of the main body is inserted.

6 Claims, 5 Drawing Sheets

(56) References Cited

U.S. PATENT DOCUMENTS

| | | | |
|---|---|---|---|
| 5,931,736 A * | 8/1999 | Scherer et al. | 464/52 |
| 6,446,421 B1 * | 9/2002 | Kramer et al. | 56/233 |
| 6,823,562 B1 * | 11/2004 | Smith et al. | 16/421 |
| 7,882,596 B2 * | 2/2011 | Hixon | 16/426 |

FOREIGN PATENT DOCUMENTS

| | | |
|---|---|---|
| JP | 59-150221 | 10/1984 |
| JP | 1-155725 | 10/1989 |
| JP | 2003/225011 | 8/2003 |
| JP | 2005 046087 A | 2/2005 |
| JP | 2009-136251 | 6/2009 |
| JP | 2009136251 A * | 6/2009 |
| WO | WO 2004/074707 A1 | 9/2004 |

OTHER PUBLICATIONS

Japanese Office Action dated Mar. 4, 2014 issued in Japanese Patent Application No. 2010-192914 and English Translation, 7 pp.

* cited by examiner

ANTI-VIBRATION STRUCTURE FOR OPERATION LEVER OF PORTABLE BRUSH CUTTER

CROSS-REFERENCE TO RELATED APPLICATION(S)

This application claims priority from Japanese Patent Application No. 2010-192914 filed on Aug. 30, 2010, the entire contents of which are herein incorporated by reference.

FIELD

The present invention relates to an anti-vibration structure for an operation lever of a portable brush cutter that can achieve an optimum anti-vibration efficiency in accordance with the using state of the brush cutter, easily attach or replace anti-vibration material (e.g., vibration-proof material) for a pole, and readily secure a wire route.

BACKGROUND

In general, a brush cutter includes an engine attached at the base portion of the pole to drive an operation unit. A cutter (operation unit) is disposed at the front-end of the pole to connect the engine and the cutter via a transmission shaft. The brush cutter is normally operated by gripping the handle provided in the middle of the pole and operating a group of levers provided near the handle. According to the conventional brush cutter, the vibration of the engine is directly transmitted to the user's hand, and the human body is adversely affected when brush cutting is performed for a long time. Thus, it has been proposed to dispose anti-vibration materials, such as anti-vibration rubber or a metal spring, between the engine and the gripping portion, thereby dampening the vibration from the engine so as not to be transmitted to the gripping portion.

For example, an anti-vibration material is provided between the engine and the pole, and two divided lever devices are attached to the outside of the anti-vibration material such that the vibration of the engine is not transmitted to the lever devices from the pole (see, for example, JP-2003-225011-A).

However, in the above-mentioned structure, since the anti-vibration material and the lever devices are fixedly attached with each other, the deformable amount of the anti-vibration material can not be adjusted.

Further, since the anti-vibration material is formed into a cylindrical shape, the pole should be inserted in the anti-vibration material from the end thereof in order to mount the anti-vibration material thereon, and it is difficult to attach or replace the anti-vibration material. Further, since a wire needs to be passed through a through-hole formed in the cylindrical-shaped anti-vibration material, it is difficult to install the wire.

SUMMARY

One object of the present invention is to provide an anti-vibration structure for an operation lever in a portable brush cutter that can obtain an optimum anti-vibration effect in accordance with the using state of the brush cutter by, for example, adjusting the deformable amount of the anti-vibration material and changing the anti-vibration property.

According to a first aspect of the present invention, there is provided an anti-vibration structure for an operation lever of a portable brush cutter, the structure including: a pole; an operation unit, such as a cutter, provided at a front portion of the pole; an engine provided at a base portion of the pole and connected to the operation unit through a transmission shaft so as to drive the operation unit; and a lever device provided at the base portion of the pole and configured to allow the user to control an operation of the engine by pulling/returning a throttle wire, wherein the lever device includes: a main body through which the pole is inserted in an axial direction, the main body including protrusions protruding from both ends in the axial direction; support members provided on the pole to support the both ends of the main body such that the main body is separated from the pole, each support member including a recess; and anti-vibration materials accommodated in the recesses of the support members so as to be sandwiched between the support members and the main body in the axial direction, respectively, each anti-vibration material including a groove to which a respective one of the protrusions of the main body is inserted.

According to a second aspect of the present invention, there may be provided the structure, wherein the protrusions and the grooves each has an H-like shape.

According to a third aspect of the present invention, there may be provided the structure, wherein an open area of each recess is larger than an area of each anti-vibration material.

According to a fourth aspect of the present invention, there may be provided the structure, wherein each support member is formed of dividable upper and lower parts between which the pole is fixed.

According to a fifth aspect of the present invention, there may be provided the structure, wherein, in the support member of the operation unit side, the anti-vibration material is provided for each of the upper and lower parts, and wherein, in the support member of the engine side, while the anti-vibration material is provided for one of the upper and lower parts, the anti-vibration material is not provided for the other of the upper and lower parts so as not to interfere with the throttle wire.

According to the first aspect of the present invention, since the main body of the lever device is fixed to the support members through the anti-vibration materials and the support members are fixed to the pole, the vibration of the pole is absorbed and dampened by the anti-vibration materials, reducing the vibration transmitted to the main body. The recess for accommodating the anti-vibration material is formed at the support member, and the anti-vibration material is sandwiched between the support member and the lever device in the axial direction of the pole. Therefore, the anti-vibration material can be deformed in the direction perpendicular to the pole, that is, in the direction of the vibration of the support member. Thus, the vibration can be efficiently absorbed.

The main body of the lever device is fixed to the support members through the anti-vibration material. And, the anti-vibration material can be loosely maintained therebetween so as to be largely deformable, or can be tightly maintained therebetween so as to be hardly deformable, by sliding the support members with respect to the main body in the axial direction of the pole. Accordingly, it is possible to adjust the deformable amount of the anti-vibration material and change the anti-vibration property by increasing or decreasing the pressure applied to the anti-vibration material. While the vibration situation (how the vibration transmits the lever) is changed depending on the types of the brush cutter main body or the types of the operation portion such as the cutter, an optimum anti-vibration effect can be obtained in accordance with the using state of the brush cutter by changing the anti-vibration property. For example, since the vibration situation is changed by the rotation speed of the cutter as the operation unit, an anti-vibration property may be optimally set in accordance with the rotation speed.

According to the second aspect of the present invention, since the protrusion of the main body and the open groove of the anti-vibration material are formed with H-shapes, the up-down movement and the left-right movement of the protrusion are regulated at the horizontal groove walls and the vertical groove walls of the open groove, respectively. Thus, the positioning of main body between the support members can be ensured.

According to the third aspect of the present invention, by forming the open area of the accommodation recess to be larger than the area of the anti-vibration material, the deformable amount the anti-vibration material within the accommodation recess can be set large, and the deformation of the anti-vibration material can be effectively absorbed.

According to the fourth aspect of the present invention, since the support members are dividable into the upper and lower parts such that the pole is fixed in therebetween, the anti-vibration materials can be easily attached to the support members before combining the divided upper and lower parts, or can be replaced by dividing the upper and lower parts from the combined state. Thus, the work can be simplified.

According to the fifth aspect of the present invention, the anti-vibration materials having a large volume is omitted from the upper part of the support member of the engine side end so as not to interfere with the throttle wire which is drawn out from the lever device toward the engine. Thus, a space for passing through the throttle wire can be ensured. Further, since the throttle wire can be installed regardless of the lever device, installment and replacement of the throttle wire can be simplified.

DETAILED DESCRIPTION

Figure 1A:
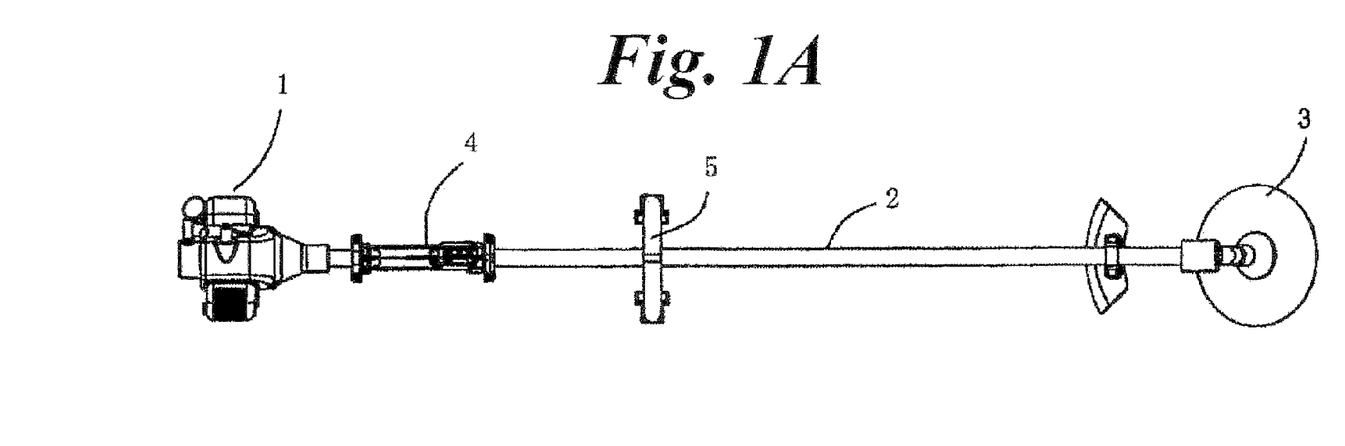
FIGS. 1A and 1B are a plan view and a side view of a portable brush cutter of an embodiment, respectively.
Figure 1B:
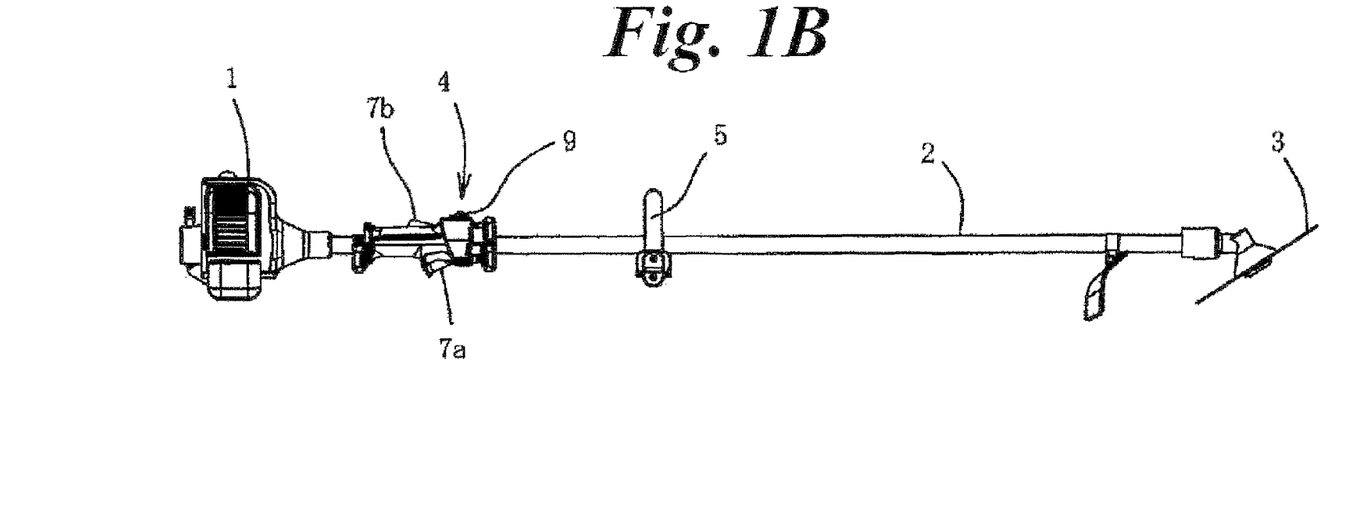

A portable brush cutter of an embodiment, as shown in FIGS. 1A and 1B, includes an engine 1 and a pole 2. The base portion of the pole 2 is connected to the engine 1, so as to be extended therefrom. A cutter 3 (an operation unit) is rotatably supported at the end of the pole 2, and a lever device 4 is attached to the engine side of the pole 2. The lever device 4 has a lever linked with a throttle wire, and the operation of the engine is controlled by the lever through the throttle wire. The user can perform a brush cutting operation with the bush cutter such that the user suspends the brush cutter downwardly while gripping a handle 5 provided at the pole 2 to control the angle and direction of the cutter 3, and adjusts the output of the engine 1 through the lever device 4.

The pole 2 is a hollow pipe in which a transmission shaft (not shown) is rotatably supported, and the base portion of the transmission shaft is connected to the engine 1 through a clutch. The transmission shaft rotates the cutter 3 rotatably supported at the front-end of the pole 2 by being driven by the engine 1.

The lever device 4 is attached to the middle portion of the pole 2 at the engine 1 side. By appropriately positioning the lever device 4, the user can grip the lever of the lever device 4 with an appropriate weight balance so that the brush cutter is efficiently operated.

Figure 2:
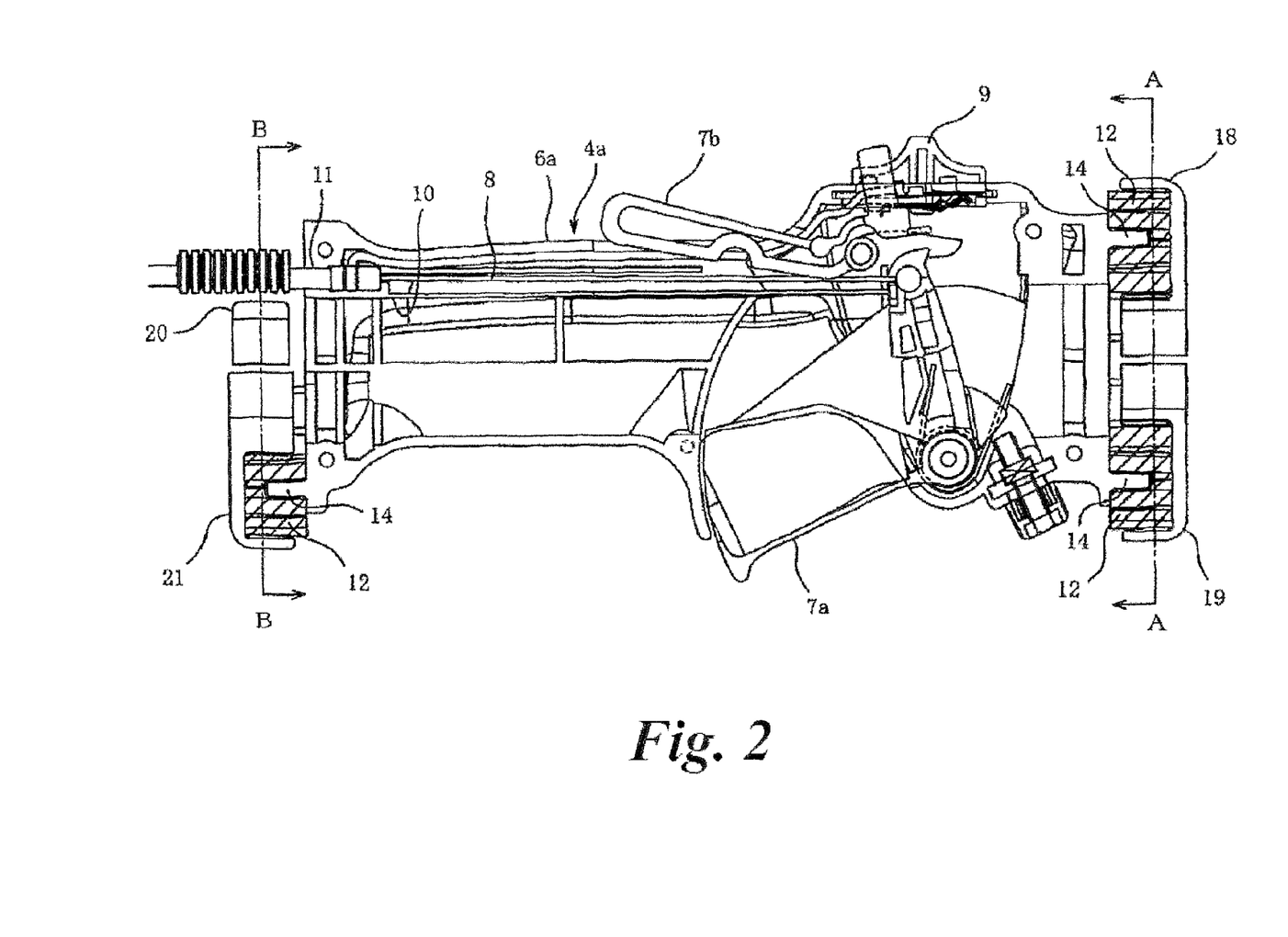
FIG. 2 is a cross-sectional view of the lever.

The lever device 4 is formed into a cylindrical shape to be easily held by a hand, and includes plural levers and throttle wires to be operated. As shown in FIG. 2, a throttle lever 7a is positioned so as to be easily operated in a hand-held state. The output of the engine 1 is controlled by the throttle lever 7a through throttle wire 8. Further, an engine stop switch 9 slidably operated by finger, a safety lever 7b that locks the operation of the throttle lever 7a etc. are provided.

The brush cutter has the structure as described above.

The lever device 4 is connected to the pole 2 via an anti-vibration structure. The anti-vibration structure for the operation lever is described in detail with reference to FIGS. 2 to 6.

The lever device 4 includes a main body 4a. The main body 4a is formed by combining left and right main body members 6a, 6b with a fixing member. In the main body 4a, a through-hole 10 for inserting (see, e.g., FIG. 5) the pole 2 is formed at a center portion, and a through-hole 11 for inserting (see, e.g., FIG. 6) the throttle wire 8 is formed at an upper portion of the engine 1 side end.

Figure 5:
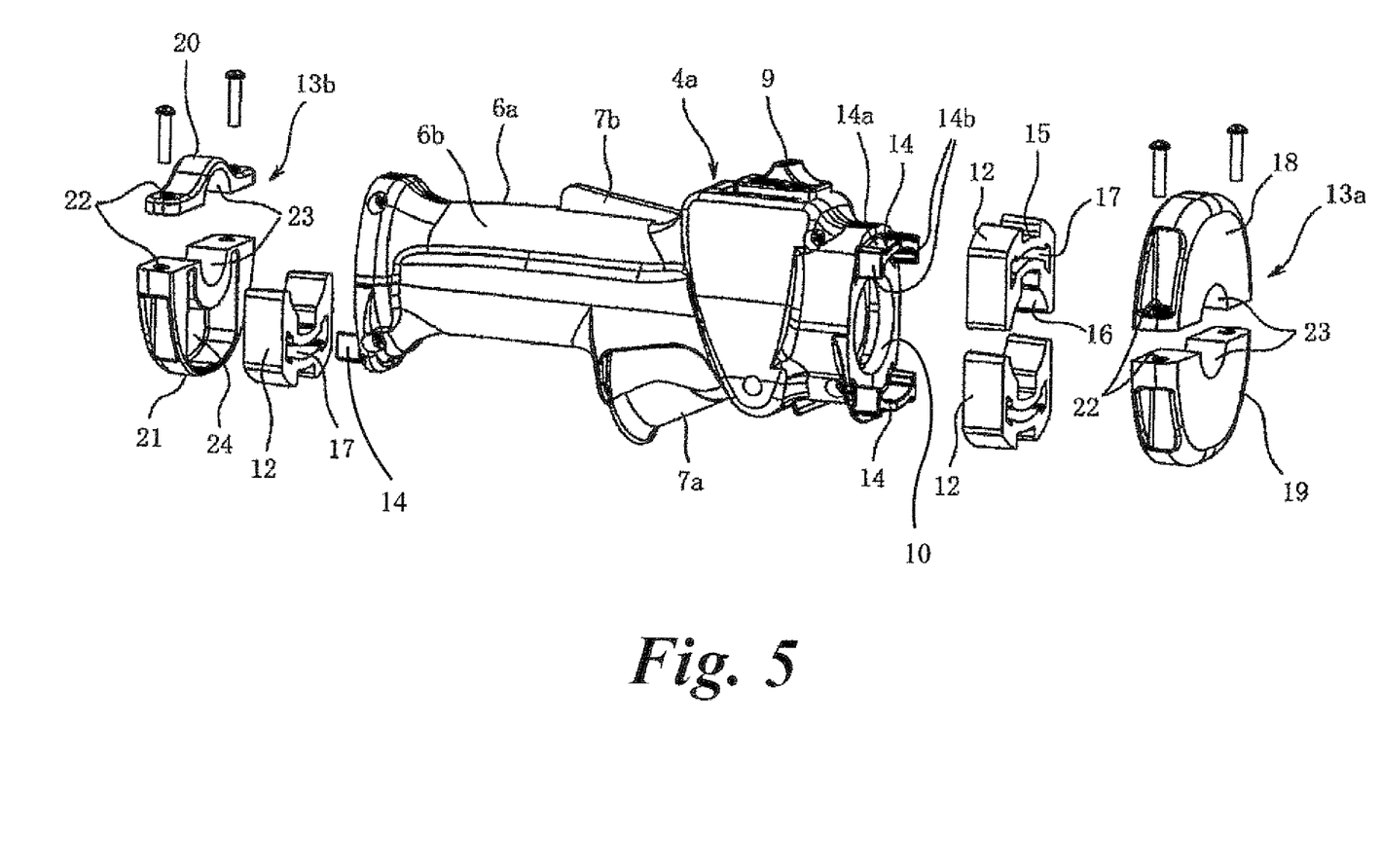
FIG. 5 is an exploded perspective view of a lever device.
Figure 6:
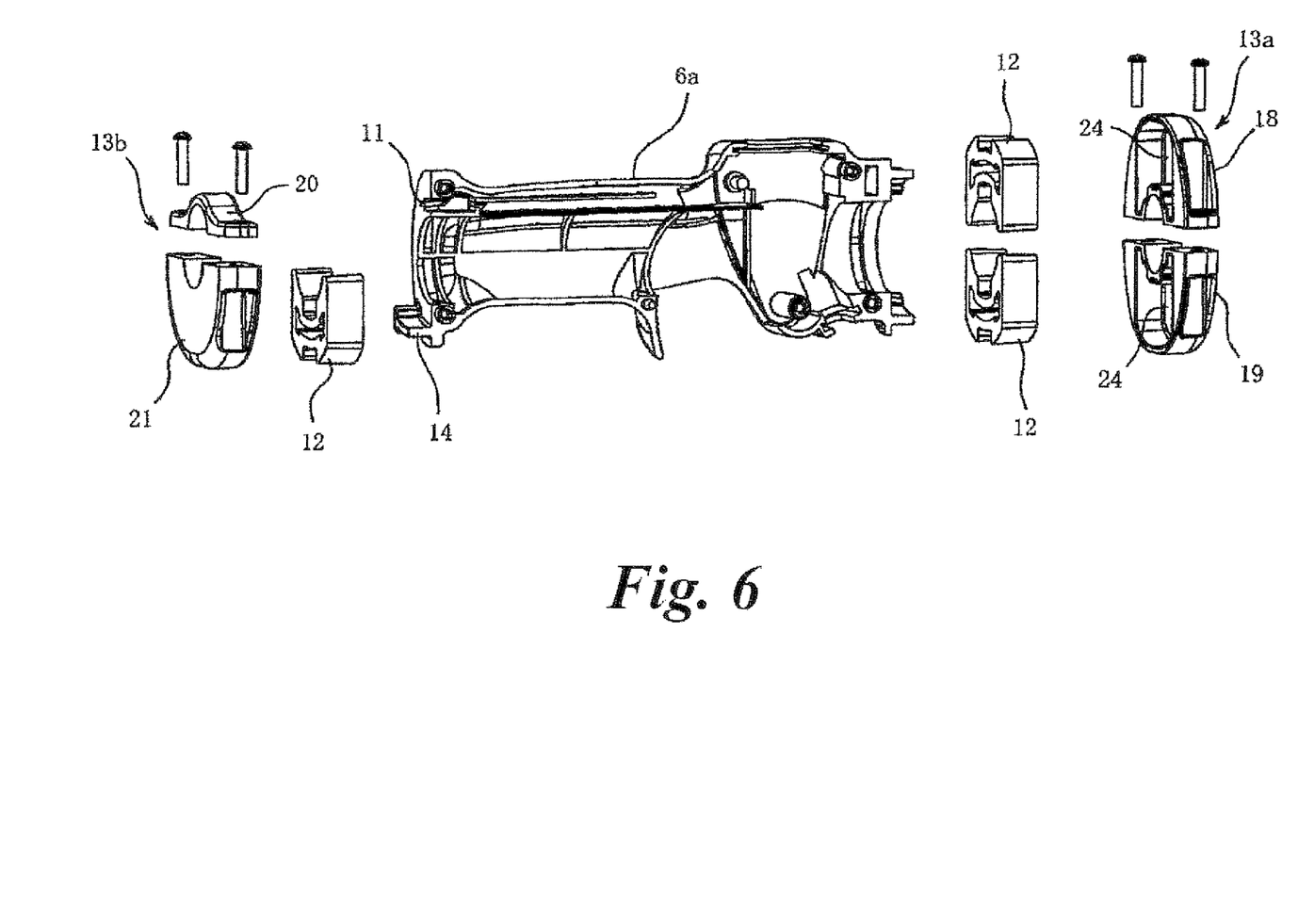
FIG. 6 is an exploded perspective view seen from another angle different from FIG. 5.

Support members 13a, 13b are provided at both ends of the main body 4a of the lever device 4 in a axial direction of the pole 2, and anti-vibrations material 12 are disposed between the support members 13a, 13b and the main body 4a. The support members 13a, 13b are fixed to the pole 2 to support the main body 4a at the both ends.

The main body 4a of the lever device 4 is formed into a cylindrical shape. Protrusions 14 protrude from the both ends of the main body 4a. From the cutter 3 side end, the protrusions 14 protrude at the upper and lower portions. And, from the engine 1 side end, the protrusion 14 protrudes at the lower portion. Each protrusion 14 extends in the axial direction of the pole 2, and is formed into a substantially H-shape including an ark-shaped center piece 14a and both end pieces 14b.

Each anti-vibration material 12 is made of an elastic member, such as elastomer. Each anti-vibration material 12 is shaped such that both sides thereof are parallel with each other, and that the upper and the lower surfaces thereof are convexly curved. In each anti-vibration material 12, recesses 15, 16 are centrally formed on the upper surface (outer side) and the lower surface (inner side). A substantially H-shaped open groove 17 curved in an arc shape are formed between the recesses 15, 16 to penetrate through each anti-vibration material 12. A size and shape of each open groove 17 is set in accordance with a size and a shape of each protrusion 14, and the anti-vibration materials 12 are provided correspondingly with the protrusions 14 of the main body 4a. Two of the anti-vibration materials 12 are provided at the cutter 3 side, while one of the anti-vibration material 12 is provided at the engine 1 side. The two anti-vibration materials 12 at the cutter 3 side are disposed up and down so as to be symmetric in an up-down direction in a state where the pole 2 is fitted therebetween.

Two of the support members 13a, 13b are provided at the both front and rear ends of the main body 4a through the anti-vibration materials 12, respectively. Each support member 13a/13b is formed of dividable upper and lower parts. The support member 13a of the cutter 3 side is symmetrically divided into upper and lower support members 18, 19, and the support member 13b of the engine 1 side is divided into an upper support body 20 and a lower support body 21. The lower support body 19 and the lower support member 21 have the same shape. Each of the upper and lower support members 18, 19, 21 is a plate member having a semicircular shape including an arc-shaped portion and a bottom portion. Both ends of the arc-shaped portion are formed into recesses, and a through hole 22 for inserting a bolt is formed at the bottom portion of each recess. A semicircular recessed surface 23 having the same curvature as the pole 2 is centrally formed at the bottom portion. The recess 24 for accommodating the anti-vibration material 12 is formed on each of the upper and lower support members 18, 19, 21, at a side opposite to the main body 4a of the lever device 4.

The upper support body 20 of the support member 13b at the engine 1 side is formed into a bow shape, in which a recessed surface 23 having the same shape and size as the semicircular recessed surface 23 of the lower support member 21 is centrally formed at the bottom portion, and the through hole 22 for inserting the bolt is formed at both ends.

The support members 13a and 13b and the main body 4a are assembled through the anti-vibration materials 12, as follows. The throttle wire 8 is attached first to the throttle lever 7a of the left main body member 6a, and passed through the through-hole 11 formed at the left main body member 6a. Then, the left and right main body members 6a, 6b are combined and fixed by bolts and nuts in a state where the pole 2 is fitted therebetween. In this state, a slight gap is formed between the main body 4a and the pole 2. Next, the protrusions 14 protruding forward and backward from the main body 4a are inserted in the open grooves 17 of the anti-vibration materials 12, respectively. At the cutter 3 side, the upper and lower support members 18, 19 are disposed from outside such that the upper and lower anti-vibration materials 12 are accommodated within the accommodation recesses 24 of the upper and lower support members 18, 19. Then, the upper and lower support members 18, 19 are fixed by bolts and nuts at the through holes 22 in a state where the pole 2 is fitted therebetween. At the engine 1 side, the lower anti-vibration material 12 is accommodated within the accommodation recess 24 of the lower support member 21, and the upper support member 20 and the lower support member 21 are fixed by bolts and nuts at the through hole 22 in a state where the pole 2 is fitted therebetween. The thickness of the anti-vibration material 12 is set to be larger than the depth of the accommodation recesses 24 of the upper and lower support members 18, 19, 21.

Figure 3:
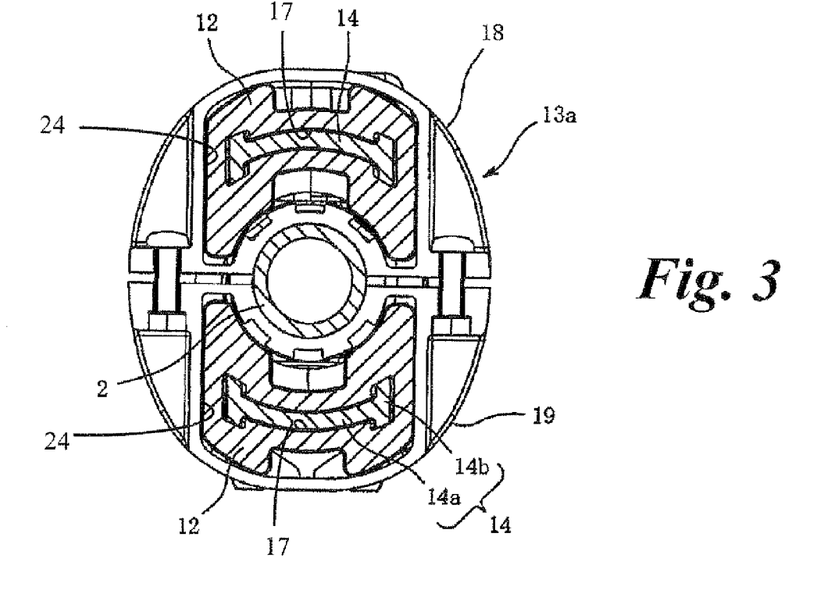
FIG. 3 is a cross-sectional view taken along line A-A of FIG. 2.
Figure 4:
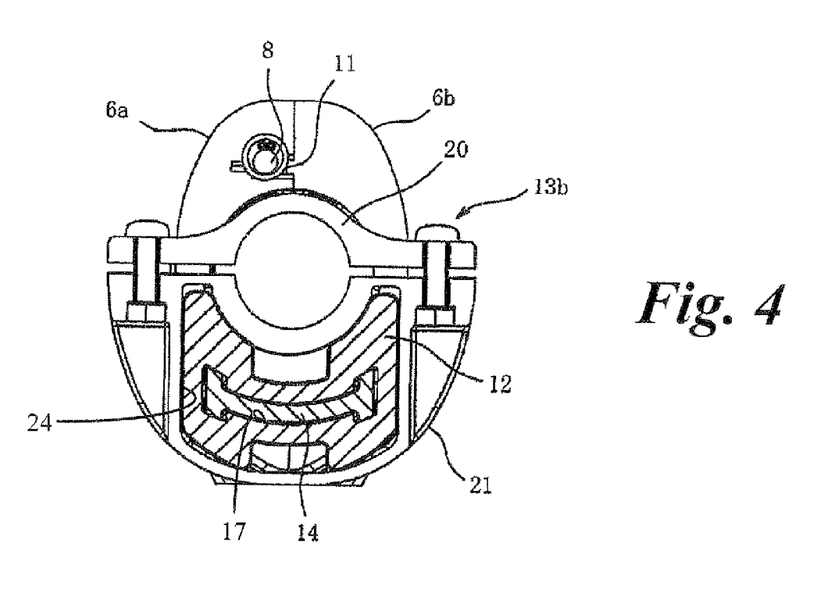
FIG. 4 is a cross-sectional view taken along line B-B of FIG. 2.

According to the configuration, the main body 4a of the lever device 4 is supported by the support members 13a, 13b through the anti-vibration materials 12 so that the slight gap is formed between the main body 4a and the pole 2. Since the vibration of the pole 2 is not directly transmitted to the main body 4a, but transmitted through the anti-vibration materials 12, the vibration of the pole 2 can be absorbed and dampened by the anti-vibration materials 12, and the vibration transmitted to the main body 4a can be reduced. The recesses 24 accommodating the anti-vibration materials 12 are formed at the support members 13a, 13b, and the anti-vibration materials 12 are sandwiched between the support members 13a, 13b and the main body 4a in the pole 2 axial direction, not in a direction perpendicular to the pole 2 axial direction. Therefore, the anti-vibration material 12 can be deformed in the perpendicular direction in which the support members 13a, 13b vibrate, thereby efficiently absorbing the vibration.

In the lever device 4, the main body 4a is not directly fixed to the support members 13a, 13b, but fixed thereto through the anti-vibration materials 12. Thus, it is possible to loosen the main body 4a and the support members 13a, 13b so that the anti-vibration materials 12 can largely deform therebetween, or to tighten them so that the anti-vibration materials 12 hardly deform therebetween, by sliding the support members 13a, 13b with respect to the main body 4a in the axial direction of the pole 2. That is, the pressure applied to the anti-vibration material 12 can be increased or decreased to thereby adjust the deformable amount of the anti-vibration material 12 and change the anti-vibration property. While the vibration situation (how the vibration transmits to the lever device 4) changes depending on the types of the lever device 4, the types of the cutter or the like, the anti-vibration property can be changed to obtain an optimum anti-vibration effect against the vibration situation. For example, since the rotation speed of the cutter 3 affects the vibration situation, the anti-vibration property may be set in accordance with the rotation speed of the cutter 3. As described above, an optimum anti-vibration effect can be obtained in accordance with the using stage of the brush cutter.

In general, while the anti-vibration effect of the anti-vibration material 12 can be increased by decreasing the rubber hardness thereof, when the rubber hardness is simply decreased, the deformable amount of the anti-vibration material 12 is increased, and the positioning of main body 4a between the support members 13a, 13b becomes difficult. In the embodiment, since each of the open groove 17 of the anti-vibration material 12 and the protrusion 14 of the main body 4a to be inserted thereinto are formed into the H-shape, the up-down movement of the center piece 14a of the protrusion 14 and the left-right movement of the end pieces 14b are regulated at the center portion and the both sides of the open groove 17, respectively, thereby ensuring the positioning of the main body 4a between the support members 13a, 13b.

The recesses 15 and 16 are formed on the anti-vibration material 12, and the open area of the accommodation recess 24 of the support members 13a, 13b is set larger than the area of the anti-vibration material 12. Thus, the deformable amount of the anti-vibration material 12 within the accommodation recess 24 can be set large, and the deformation of the anti-vibration material 12 can be effectively absorbed.

For example, in JP-2003-225011-A, since the anti-vibration material is formed into a cylindrical shape, it is required to insert and slide the anti-vibration material along a long distance from the end of the pole for attaching it, or to slide the anti-vibration material along a long distance toward the end of the pole for detaching it. Thus, it was troublesome to attach or replace the anti-vibration material. In the embodiment, since the support members 13a, 13b are dividable into the upper and lower parts (the support members 18, 19, 21 and the support body 20) such that the pole 2 is fitted in therebetween, the anti-vibration materials 12 can be easily attached to the support members 13a, 13b before combining the divided upper and lower parts, or can be replaced by dividing the upper and lower parts from the combined state. Thus, the work can be simplified.

In the embodiment, since the anti-vibration material 12 has a large volume, the anti-vibration materials 12 is omitted from the upper part (the support body 20) of the support member 13b of the engine 1 side end so as not to interfere with the throttle wire 8 which is drawn out from the lever device 4 toward the engine 1. Thus, a space for passing through the throttle wire 8 can be ensured. Further, since the throttle wire 8 can be installed regardless of the lever device 4, installment and replacement of the throttle wire 8 can be simplified.

By applying the attachment structure for an operation lever to a portable brush cutter, the operation can be comfortably performed, and workability is thus improved.

The present invention is not limited to the above-mentioned embodiment, and may be embodied without departing from the spirit and scope of the invention, for example, by modifying components thereof.

For example, in the above-mentioned embodiment, the engine-side support member 13*b* is configured by the upper support body 20 and the lower support member 21, and the anti-vibration material 12 is not provided for the upper support body 20. However, the engine-side support member 13*b* may be configured by upper and lower support members on each of which the anti-vibration material 12 is provided, similarly to the cutter-side support member 13*a*. That is, instead of the upper support body 20, an upper support member having the same shape with the upper and lower support members 18, 19, 21 may be provided, and the anti-vibration material 12 may be provided for the upper support member. In this case, the upper protrusion 14 may be correspondingly provided at the engine-side end of the main body 4*a*, as at the cutter-side end thereof. And, the throttle wire 8 may be drawn out from the lever device 4 so as to avoid the upper support member.

The invention claimed is:

1. A portable brush cutter including anti-vibration structure, the portable brush cutter comprising:
    a pole;
    an operation unit provided at a front portion of the pole;
    an engine provided at a base portion of the pole and connected to the operation unit to drive the operation unit; and
    a lever device provided at the base portion of the pole and configured to allow a user to control an operation of the engine by pulling/returning a throttle wire,
    wherein the lever device includes:
        a throttle lever;
        a main body in which the throttle lever is secured and through which the pole is inserted in an axial direction, the main body including protrusions protruding from both ends in the axial direction;
        support members provided on the pole to support the both ends of the main body such that the main body is separated from the pole, each support member including a recess; and
        anti-vibration materials accommodated in the recesses of the support members so as to be sandwiched between the support members and the main body in the axial direction, respectively, each anti-vibration material including a groove to which a respective one of the protrusions of the main body is inserted, wherein the protrusions and the grooves each has an H-like shape.

2. The portable brush cutter of claim 1, wherein an open area of each recess is larger than an area of each anti-vibration material.

3. The portable brush cutter of claim 1, wherein each support member is formed of dividable upper and lower parts between which the pole is fixed.

4. The portable brush cutter of claim 1,
    wherein each support member is formed of dividable upper and lower parts, the anti-vibration material being provided for the upper and lower parts of at least one of the support members, and
    wherein the pole is fixed between the upper and lower parts of each support member.

5. The portable brush cutter of claim 1, wherein the H-like shape includes an arc-shaped center portion and linear end portions transversely extending from each end of the center portion.

6. A portable brush cutter including anti-vibration structure, the portable brush cutter comprising:
    a pole;
    an operation unit provided at a front portion of the pole;
    an engine provided at a base portion of the pole and connected to the operation unit to drive the operation unit; and
    a lever device provided at the base portion of the pole and configured to allow a user to control an operation of the engine by pulling/returning a throttle wire,
    wherein the lever device includes:
        a throttle lever;
        a main body in which the throttle lever is secured and through which the pole is inserted in an axial direction, the main body including protrusions protruding from both ends in the axial direction;
        support members provided on the pole to support the both ends of the main body such that the main body is separated from the pole, each support member including a recess; and
        anti-vibration materials accommodated in the recesses of the support members so as to be sandwiched between the support members and the main body in the axial direction, respectively, each anti-vibration material including a groove to which a respective one of the protrusions of the main body is inserted,
    wherein each support member is formed of dividable upper and lower parts between which the pole is fixed,
    wherein, in the support member of the operation unit side, the anti-vibration material is provided for each of the upper and lower parts, and
    wherein, in the support member of the engine side, while the anti-vibration material is provided for one of the upper and lower parts, the anti-vibration material is not provided for the other of the upper and lower parts so as not to interfere with the throttle wire.

* * * * *